(12) United States Patent
Hustava et al.

(10) Patent No.: US 11,982,776 B2
(45) Date of Patent: May 14, 2024

(54) PIEZOELECTRIC TRANSDUCER WITH MODEL-BASED FIELD EQUALIZATION

(71) Applicant: SEMICONDUCTOR COMPONENTS INDUSTRIES, LLC, Phoenix, AZ (US)

(72) Inventors: Marek Hustava, Bratislava (SK); Jiri Kantor, Hrusky (CZ); Tomas Suchy, Brno (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 426 days.

(21) Appl. No.: 17/522,019

(22) Filed: Nov. 9, 2021

(65) Prior Publication Data

US 2022/0146653 A1    May 12, 2022

Related U.S. Application Data

(60) Provisional application No. 63/198,768, filed on Nov. 11, 2020.

(51) Int. Cl.
*G01S 7/52* (2006.01)
*G01S 7/526* (2006.01)
*G01S 15/931* (2020.01)

(52) U.S. Cl.
CPC .......... *G01S 7/52006* (2013.01); *G01S 7/526* (2013.01); *G01S 15/931* (2013.01)

(58) Field of Classification Search
CPC ..... G01S 7/52006; G01S 7/526; G01S 15/931
See application file for complete search history.

(56) References Cited

U.S. PATENT DOCUMENTS 10,663,568 B2    5/2020    Suchy et al.
11,163,048 B2    11/2021    Suchy et al.
(Continued)

FOREIGN PATENT DOCUMENTS

EP    2899563 A1    7/2015
EP    2347231 A1    10/2019

OTHER PUBLICATIONS

Reiss ("Design of Audio Parametric Equalizer Filters Directly in the Digital Domain", IEEE Transactions on Audio Speech and Language Processing, Sep. 2011) (Year: 2011).*
(Continued)

*Primary Examiner* — Yuqing Xiao
*Assistant Examiner* — Christopher Richard Walker
(74) *Attorney, Agent, or Firm* — Ramey LLP

(57) ABSTRACT

Disclosed sensors, sensor controllers, and sensor control methods enhance transducer performance using a model-based equalization method that can be performed in the field. One illustrative method for operating a piezoelectric-based sensor includes: sensing a response of a piezoelectric transducer as a function of frequency; deriving parameter values of an equivalent circuit for the piezoelectric transducer from the response; using a squared magnitude of the equivalent circuit's transfer function to determine a system level selectivity; and adapting at least one operating parameter of the sensor based on the system level selectivity. One illustrative controller for a piezoelectric transducer includes: a transmitter that drives the piezoelectric transducer; a receiver that senses a response of the piezoelectric transducer; and a processing circuit coupled to the transmitter and to the receiver to calibrate the transducer using the foregoing method.

17 Claims, 4 Drawing Sheets

(56) References Cited

U.S. PATENT DOCUMENTS

| | | | |
|---|---|---|---|
| 2012/0069712 A1* | 3/2012 | Potanin | G01S 7/003 367/98 |
| 2019/0079173 A1 | 3/2019 | Kutej et al. | |
| 2019/0079174 A1 | 3/2019 | Kutej et al. | |
| 2020/0072955 A1* | 3/2020 | Haag | G01S 7/52004 |
| 2020/0158769 A1* | 5/2020 | Liu | G01R 29/22 |

OTHER PUBLICATIONS

"ULS sensor with ZIF I/Q Data transfer to ECU," An IP.com Prior Art Database Technical Disclosure,IP.com No. IPCOM000262868D, available at https://ip.com/IPCOM/000262868, IP.com Electronic Publication Date: Jul. 7, 2020, 3 pages.

* cited by examiner

PIEZOELECTRIC TRANSDUCER WITH MODEL-BASED FIELD EQUALIZATION

CROSS REFERENCE TO RELATED APPLICATIONS

The present application claims priority to provisional U.S. App. 63/198,768, filed 2020 Nov. 11 and titled "Equalizing Channels in Ultrasonic Dual Channel System" by inventors M. Hustava, T. Suchy, and J. Kantor. This provisional is hereby incorporated herein by reference in its entirety. The present application further relates to co-pending U.S. application Ser. No. 16/724,783, filed 2019 Dec. 23 and titled "Piezoelectric Transducer Controller having Model-Based Sideband Balancing" by inventors M. Hustava, T. Suchy, and J. Kantor. This application is hereby incorporated herein by reference in its entirety.

BACKGROUND

Modern automobiles are equipped with an impressive number and variety of sensors. For example, cars are now routinely equipped with arrays of piezoelectric sensors to monitor distances between the car and any nearby persons, pets, vehicles, or other obstacles. Due to environmental "noise" and safety concerns, each of the sensors may be asked to provide tens of measurements each second while the car is in motion. It is important for such sensor arrays to perform reliably.

As the number of sensors increases, so too does the need for multiple sensors to operate concurrently, increasing the risk of interference between the sensors. Because acoustic bursts from multiple sensors may be "in flight" at the same time, the echoes from bursts by a first sensor may be detected by other sensors and become erroneously associated with other bursts, leading to incorrect time-of-flight determinations and erroneous distance measurements.

Co-owned U.S. Pat. No. 10,663,568 ("Composite Acoustic Bursts for Multi-channel Sensing") addresses this issue by employing signal sideband energy to associate acoustic bursts with their originating sensors. However, the sideband attenuation depends on various factors including temperature, sensor aging, and external loading of the transducer. If the sidebands become unbalanced (subject to unequal attenuation), the accuracy of the sensors' time-of-flight determinations may be adversely affected.

Related co-pending application Ser. No. 16/724,783 ("Piezoelectric Transducer Controller having Model-Based Sideband Balancing") discloses an illustrative method for addressing this issue. Yet there remains room for improvement.

SUMMARY

Accordingly, there are disclosed herein various sensors, sensor controllers, and sensor control methods that enhance transducer performance using a model-based equalization method that can be performed in the field. One illustrative method for operating a piezoelectric-based sensor includes: sensing a response of a piezoelectric transducer as a function of frequency; deriving parameter values of an equivalent circuit for the piezoelectric transducer from the response; using a squared magnitude of the equivalent circuit's transfer function to determine a system level selectivity; and adapting at least one operating parameter of the sensor based on the system level selectivity.

One illustrative controller for a piezoelectric transducer includes: a transmitter that drives the piezoelectric transducer; a receiver that senses a response of the piezoelectric transducer; and a processing circuit coupled to the transmitter and to the receiver to calibrate the transducer using the foregoing method.

One illustrative sensing arrangement includes: a transmitter that drives the piezoelectric transducer; a receiver that senses a response of the piezoelectric transducer; and one or more controllers collectively configured to calibrate at least one of the transmitter and to the receiver using the foregoing method.

Each of the foregoing embodiments may be employed individually or together, and in conjunction with any one or more of the following optional features in any suitable combination: 1. said adapting comprises adjusting a transmit signal current to counteract a variation in transmitted sound pressure level represented by a change of the system level selectivity. 2. said adapting comprises adjusting a receive signal gain to counteract a variation in receiver sensitivity represented by a change of the system level selectivity. 3. said adapting comprises adjusting a correlator attenuation to counteract a channel imbalance indicated by the system level selectivity. 4. said using includes normalizing the squared magnitude of the equivalent circuit's transfer function. 5. using includes combining the squared magnitude of the equivalent circuit's transfer function with a stored compensation curve. 6. said using includes measuring a temperature. 7. said using includes, based on the temperature, selecting the stored compensation curve from multiple stored compensation curves. 8. performing target detection after adapting the at least one operating parameter.

DETAILED DESCRIPTION

It should be understood that the drawings and corresponding detailed description do not limit the disclosure, but on the contrary, they provide the foundation for understanding all modifications, equivalents, and alternatives falling within the scope of the appended claims.

Figure 1:
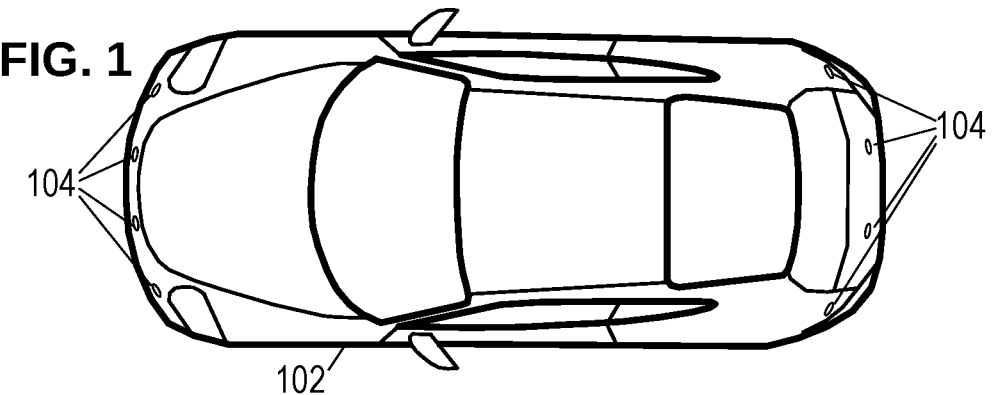
FIG. 1 is an overhead view of an illustrative vehicle equipped with piezoelectric-based sensors.

As an illustrative usage context, FIG. 1 shows a vehicle 102 equipped with a set of piezoelectric-based sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, potentially using the sensors for individual measurements as well as cooperative (e.g., triangulation, multi-receiver) measurements.

The piezoelectric-based sensors are transceivers, meaning that each sensor can transmit and receive bursts of acoustic energy. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported, e.g., as described in co-owned U.S. Pat. No. 10,663,568 ("Composite Acoustic Bursts for Multi-channel Sensing"), or through the use of orthogonal waveforms or transmissions to non-overlapping detection zones.

Figure 2:
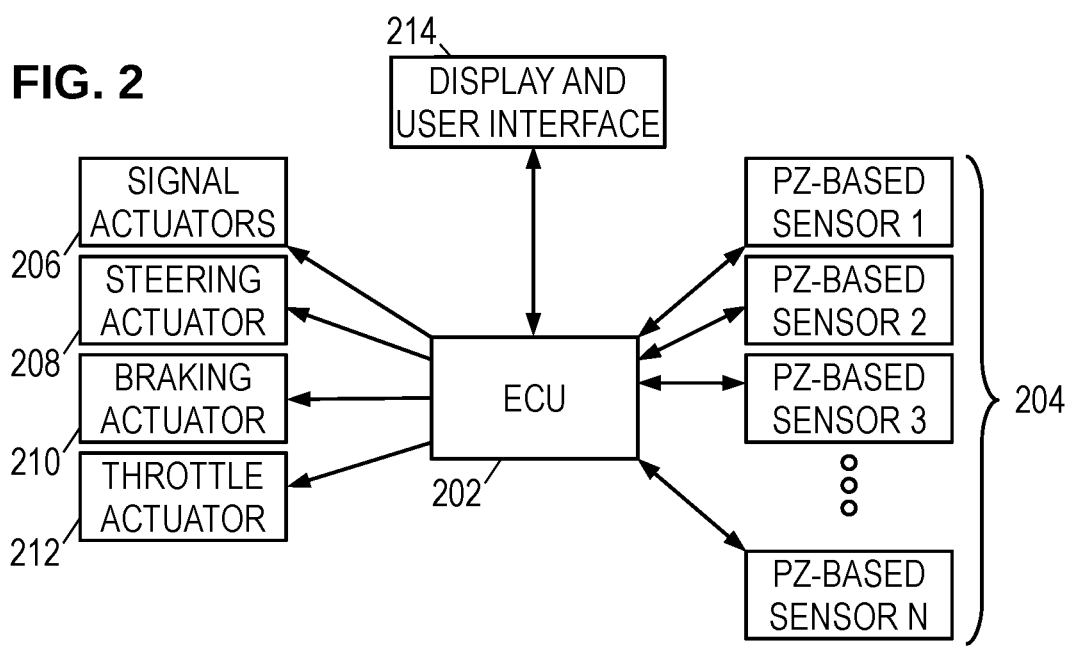
FIG. 2 is a block diagram of an illustrative parking assist system.

FIG. 2 shows an electronic control unit (ECU) 202 coupled to the various piezoelectric-based sensors 204 as the center of a star topology. Of course, other communication bus topologies including serial, parallel, and hierarchical (tree) topologies, are also suitable and contemplated for use in accordance with the principles disclosed herein. Such topologies may distribute computation burdens between sensors and the ECU, and may further employ multiple ECUs for distributed processing. To provide automated parking assistance, the ECU(s) 202 may further connect to a set of actuators such as a turn-signal actuator 206, a steering actuator 208, a braking actuator 210, and throttle actuator 212. ECU(s) 202 may further couple to a user-interactive interface 214 to accept user input and provide a display of the various measurements and system status. Using the interface, sensors, and actuators, ECU(s) 202 may provide automated parking, assisted parking, lane-change assistance, obstacle and blind-spot detection, and other desirable features.

Figure 3:
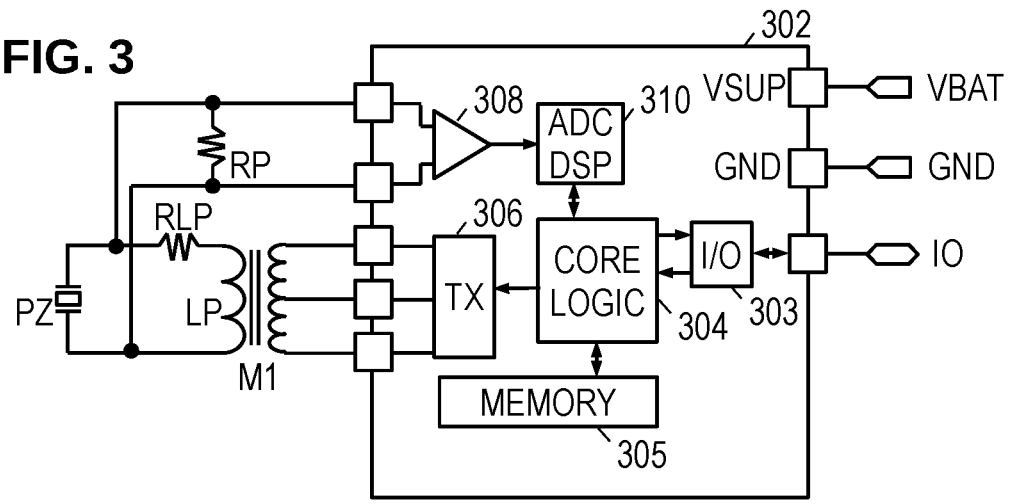
FIG. 3 is a circuit schematic of an illustrative piezoelectric-based sensor.

One potential sensor configuration is now described with reference to FIGS. 3 and 4. In practice, the sensors may employ any of a number of suitable communication and power supply techniques such as those provided in the DSI3, LIN, and CAN standards. Some of these standards support data communication via the power conductors, or via multiple bus conductors. However, in the illustrated embodiment of FIG. 3, the sensor controller 302 connects only to two power terminals (Vbat and GND) and a single input/output ("I/O" or "IO") line for bidirectional communication with the ECU 202.

The sensor controller 302 includes an I/O interface 303 that, when placed in a recessive mode, monitors the I/O line for communication from the ECU 202 and, when placed in a dominant mode, drives the I/O line to send measurements or other information to the ECU 202.

The sensor controller 302 includes a core logic 304 that operates in accordance with firmware and parameters stored in nonvolatile memory 305 to parse commands from the ECU and carry out the appropriate operations, including the transmission and reception of acoustic bursts (typically in the ultrasonic range). To transmit an acoustic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). A parallel resistor $R_P$ damps residual vibrations of the piezoelectric element.

As used herein, the term "piezoelectric transducer" includes not only the piezoelectric element, but also the supporting circuit elements for driving, tuning, and sensing, the piezoelectric element. In the illustrative embodiment, these supporting elements are the transformer M1, the parallel resistor, and any tuning or DC-isolation capacitances. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

The terminals of the piezoelectric element PZ are coupled to the sensor controller's pair of receive terminals. As the received echo signals are typically in the millivolt or microvolt range, an amplifier 308 amplifies the signal from the receive terminals. When the piezoelectric element is being actively driven by the transmitter, the amplifier's input may be clamped and/or the output may be allowed to saturate at the internal supply voltage. The amplified receive signal is digitized and processed by a digital signal processor (DSP) 310 with an integrated analog-to-digital converter (ADC).

DSP 310 optionally applies programmable methods to process the signal from the piezoelectric element to, e.g., measure the actuation period of the piezoelectric transducer during the transmission of a burst (including the ensuing reverberation or "ringing" period), and to detect and measure the timing of any received bursts or "echoes". Alternatively the digitized receive signal or a filtered version of the digitized signal can be conveyed to the ECU(s) for processing. Though this approach imposes a larger burden on bus bandwidth, the ECU(s) may offer more computational power with more easily updatable processing methods.

The processing methods may employ filtering, correlation, threshold comparisons, minimum intervals, peak detections, zero-crossing detection and counting, noise level determinations, and other customizable techniques tailored for improving reliability and accuracy. The DSP 310 or ECU(s) 202 may further process the amplified receive signal to analyze characteristics of the transducer, such as the transducer's phase response.

Figure 4A:
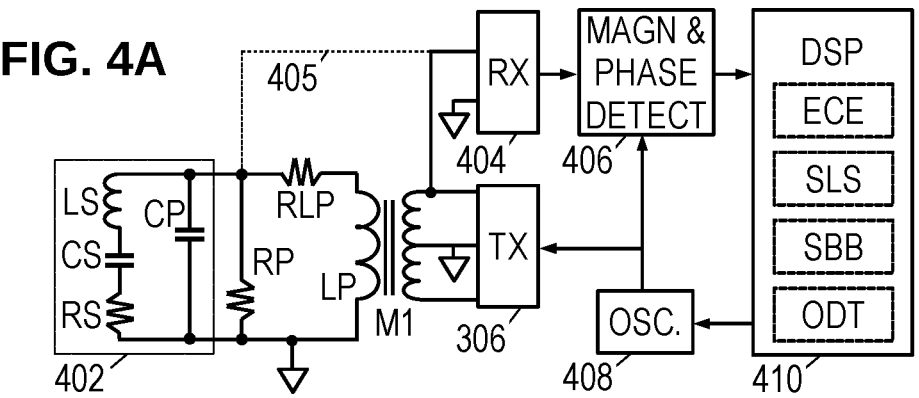
FIG. 4A is a block diagram of a sensor having an equivalent circuit for a piezoelectric transducer.

FIG. 4A is a block diagram in which the piezoelectric element PZ is replaced by an equivalent circuit 402 representing the element as a parallel capacitor $C_P$ coupled in parallel with a series combination of a series inductor $L_S$, a series capacitor $C_S$, and a series resistor $R_S$. The series combination represents mechanical action of the piezoelectric element, with $R_S$ representing the element's energy loss (which during normal operation is primarily due to the radiated acoustic energy). FIG. 4A also shows a parasitic inductance $L_P$ and parasitic resistance $R_{LP}$ of the transformer's secondary winding to provide a representative model of the piezoelectric transducer. A receiver 404 receives and amplifies the voltage signal from the equivalent circuit 402, either via the primary transformer winding or optionally via a direct connection 405 to a terminal of the equivalent circuit.

The amplified signal's magnitude and phase (or alternatively, the in-phase and quadrature phase components) are measured by a detector 406, using the signal from oscillator 408 as the phase reference. The measured phase is the difference between the transmit (tx current) signal and the receive (rx voltage) signal, e.g., as measured between zero crossings. A DSP 410 operates on the detector measurements to, e.g., perform equivalent circuit estimation ("ECE"), system level selectivity ("SLS") determination, sideband balancing ("SBB"), and obstacle detection & tracking ("ODT"). Alternatively, some or all of these functions may be implemented by ECU(s) 202.

Figure 4B:
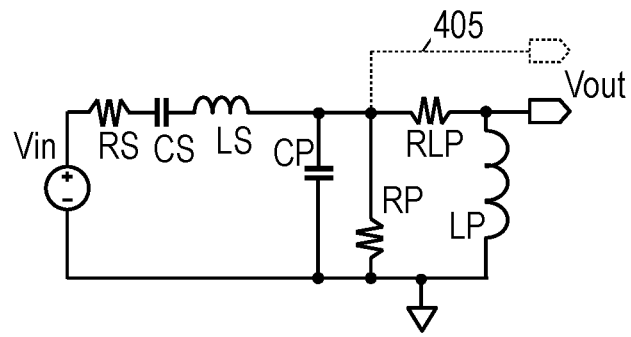
FIG. 4B is a schematic of an equivalent circuit for determining a transfer function of a piezoelectric transducer.

The equivalent circuit shown in FIG. 4B uses a series-parallel RLC circuit to model the transfer function between the received sound pressure (represented by Vin) and the receiver input (Vout). The same circuit can be used to model the transfer function from the transmitter output to the transmitted sound pressure. The series-parallel circuit has a series resonator and a parallel resonator. The series resonator has series components resistor $R_S$, capacitor $C_S$, and inductor $L_S$ connected in series. The parallel resonator has parallel components capacitor $C_P$, resistor $R_P$, and inductor $L_P$ connected in parallel. (Inductor $L_P$ includes a series resistor $R_{LP}$ to represent resistance of the transformer windings.) The transfer function can be calculated using the Laplace transform variable $s=2\pi*f*j$, where f represents frequency and j represents sqrt(−1), the imaginary unit factor for complex numbers. The series resonator impedance is $$Z_S = R_S + s*L_S + \frac{1}{(s*C_S)}$$

and the parallel resonator impedance is $$Z_P = 1 / \left( \frac{1}{R_{LP} + (s*L_P)} + s*C_P + \frac{1}{R_P} \right).$$

The resonators act as a first voltage divider, such that the transfer function to connection 405 becomes:

$$T_1 = \frac{Z_P}{Z_P + Z_S}.$$

The inductor LP with its series resistance RLP forms a second voltage divider for the Vout terminal, expressible as:

$$T_2 = \frac{s*L_P}{s*L_P + R_{LP}}.$$

When combined with the first voltage divider, the full transfer function to the Vout terminal becomes:

$$H(f) = \frac{Vout(f)}{Vin(f)} = T_1 * T_2.$$

Figure 5:
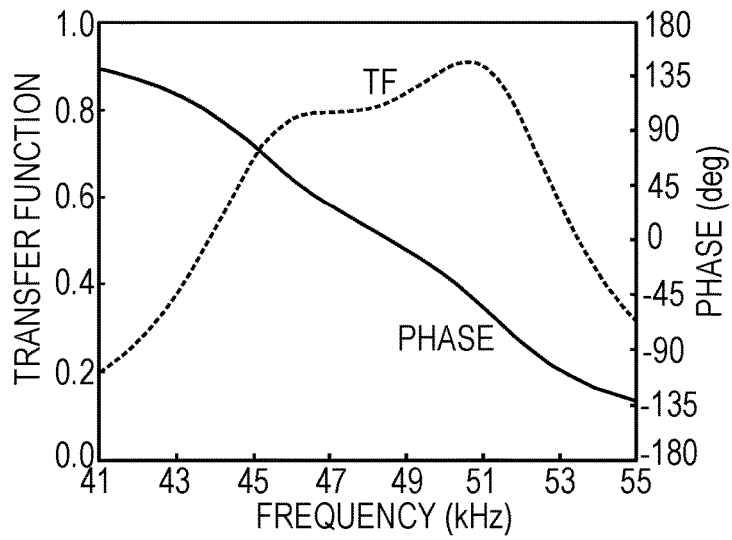
FIG. 5 is a graph of a transfer function and phase response of an illustrative equivalent circuit.

A graph of an illustrative transfer function magnitude and phase is shown in FIG. 5, assuming $R_S$=1535 Ohm, $C_S$=60 pF, $L_S$=180 mH, $C_P$=2.91 nF, $R_P$=12 kOhm, $R_{LP}$=80 Ohm, and $L_P$=3.8 mH. An analytic or numerical solution technique may be employed to find equivalent circuit parameter values that provide a best match between a measured transfer function and the modeled transfer function. For reasons not relevant here, the illustrated magnitude is normalized to 0.75 at 45.5 kHz, but such normalization is optional. Other normalizations can be used (e.g., normalizing the maximum value to unity), or omitted entirely. In some implementations, the normalization is applied to the measured transfer function, and a scale factor is used to account for the normalization when fitting the model transfer function.

The equivalent circuit of FIG. 4B is merely illustrative. Other equivalent circuit designs can be employed particularly when the driving and sensing arrangement varies for the piezoelectric transducer.

Figure 6:
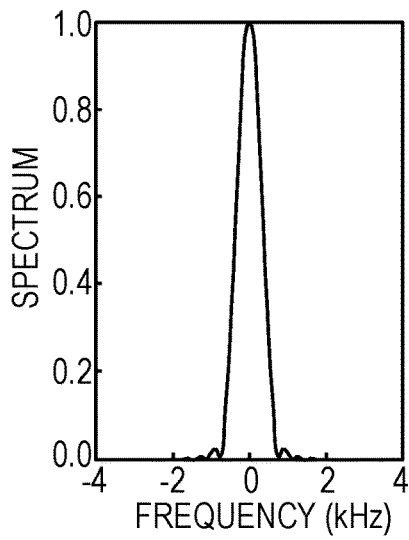
FIG. 6 is a spectrum of an illustrative diagnostic pulse.
Figure 7:
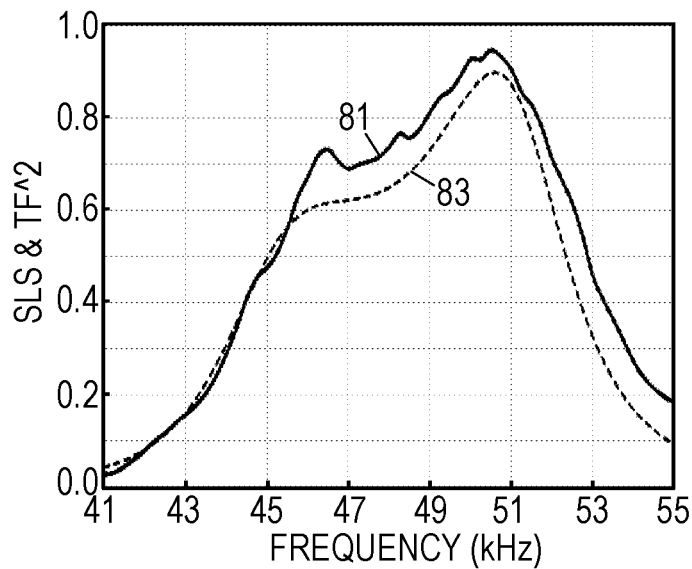
FIG. 7 is a graph comparing an illustrative squared transfer function to an illustrative system level selectivity curve.
Figure 8:
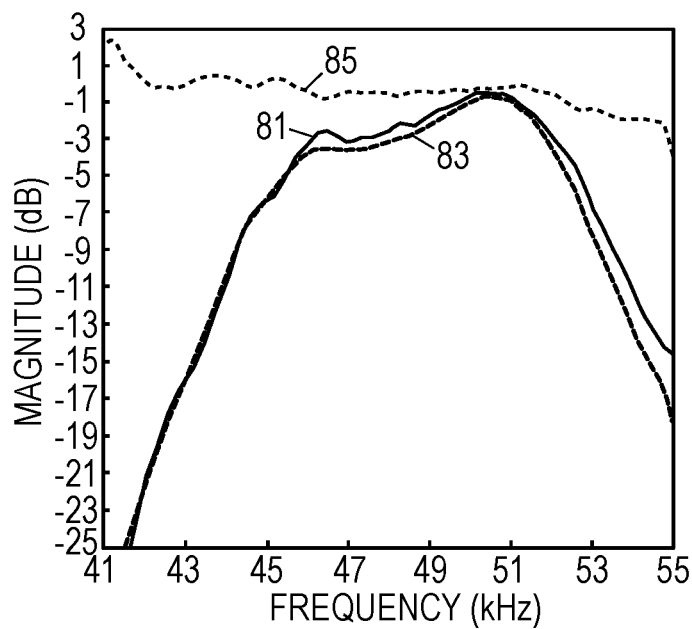
FIG. 8 is a semi-logarithmic graph of the curves of FIG. 8 and an illustrative error curve.

FIG. 6 shows the spectrum of an ultra-narrowband amplitude modulated interrogation pulse that may be applied at different transmit signal frequencies to accurately measure the transducer response as a function of frequency. Such characterization of the transducers may be performed as part of the manufacturing process. FIG. 7 shows an illustrative measured transducer response 81, or "System Level Selectivity" (SLS) curve 81, representing the conversion of the transmit signal to sound pressure which reflects from a standardized target and is converted back to a receive signal. (One illustrative target is a 75 mm diameter pipe positioned 1 m from the transducer.) FIG. 7 also shows an illustrative curve 83 representing the square of the magnitude of the model transfer function. The curves are normalized to 0.56 ($0.75^2$) at 45.5 kHz, but again, this is optional. Curves 81 and 83 are also shown in decibels in FIG. 8.

Some deviation exists between the curves because the model transfer function represents a theoretical response to a single pure frequency signal, while the measured response is produced by a narrowband signal having energy over approximately a 1 kHz frequency band. It should also be noted that the equivalent circuit is an approximation of the physical transducer response. This deviation is represented as an error curve 85 in FIG. 8, calculated as the decibel difference between the squared transfer function magnitude decibel curve 83 and the SLS decibel curve 81. The SLS decibel curve 81 can be calculated by subtracting the error curve 85 from the squared transfer function magnitude decibel curve 83, or equivalently, adding a compensation curve that is the negative of error curve 85.

Figure 9:
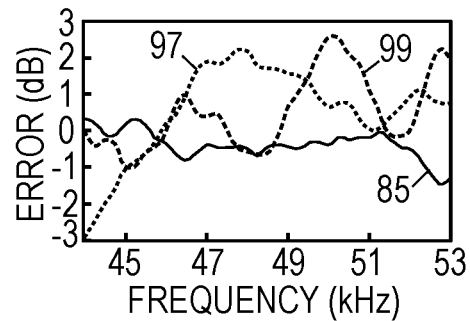
FIG. 9 is a graph of different illustrative error curves.

We note here that the transfer function curve, the SLS curve, and the compensation curve are each expected to vary based on temperature and aging of the transducer. FIG. 9 shows error curve 85 along with two other error curves 97, determined with parameter values representing different transducer temperatures. The negatives of these error curves can be stored as separate compensation curves to be used at different temperatures, or combined into a single compensation curve designed to minimize SLS curve calculation error over the expected temperature range, or to at least limit the maximum such calculation error over the range to less than, say, 2 dB.

Figure 10:
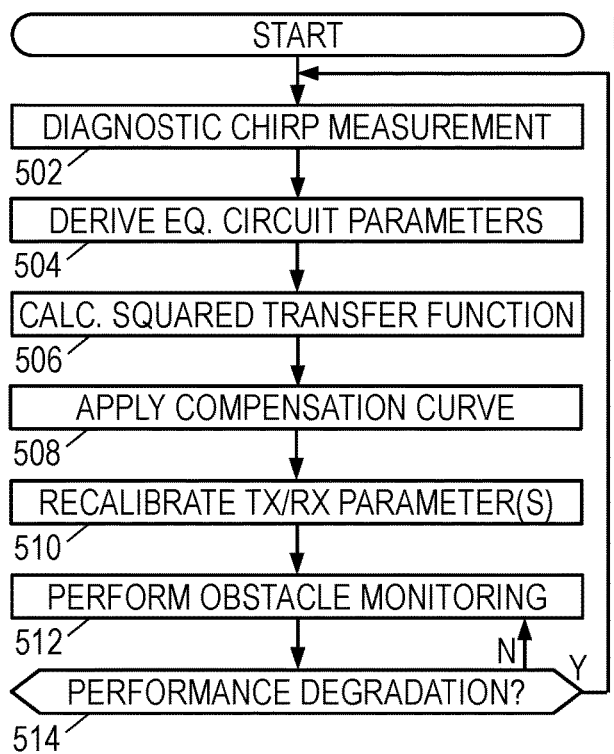
FIG. 10 is a flow diagram for an illustrative sensing method.

FIG. 10 is a flow diagram of a method that may be implemented in the field by the DSP 410 alone, by the ECU(s) 202, or by a combination thereof. The compensation curve(s) determined in the factory may be stored in non-volatile memory accessible by the relevant processor(s). In block 502, the processor(s) measure the piezoelectric transducer response as a function of frequency, using a diagnostic chirp, multiple narrowband pulses at different frequencies, a frequency transform of an impulse response, or other spectrum measurement technique. It is expected that this measurement will be performed more quickly, e.g., at fewer frequencies, than the factory calibration process. One contemplated implementation uses a diagnostic wideband chirp ranging from 15 kHz below the transducer's center frequency to 15 kHz above the transducer's center frequency. The exact bandwidth can be tailored to that of the piezoelectric transducer.

In block 504, the processor(s) use the response spectrum to derive parameters of an equivalent circuit model for the piezoelectric transducer. One illustrative technique is described in co-pending U.S. application Ser. No. 16/724,783 ("Piezoelectric Transducer Controller having Model-Based Sideband Balancing"), but prior art analytic and numerical solution techniques would also be suitable.

In block 506, the derived parameters are used to calculate the squared magnitude of the equivalent circuit's transfer function. In block 508, the processor(s) add the compensation curve to the squared magnitude to obtain an estimated SLS decibel curve. Where multiple such compensation curves are available, the processor(s) may employ a temperature sensor to select the appropriate compensation curve or to perform interpolation between such curves. In some implementations, the DSP 410 uses one or more temperature-sensitive elements on a substrate thermally coupled to between the piezoelectric transducer and active electronics to detect a temperature and thermal gradient, enabling the transducer temperature to be accurately estimated.

In block 510, the processor(s) employ the estimated SLS curve to detect, e.g., sideband imbalances which may cause signals in an upper sideband to experience a different attenuation than signals in a lower sideband. The SLS curve may additionally or alternatively be employed to detect deviation from a desired transmit sound pressure level, which could adversely affect detection range. Where any such imbalances or degradation is detected, the processor(s) can recalibrate the operating parameters of the transmitter and/or receiver. For example, the processors may increase transmit signal current to counteract a loss in transmitted sound pressure level and/or may increase receive amplifier gain to counteract increased attenuation by the piezoelectric element. Upper and lower sideband correlator attenuations may be adjusted to counteract any detected sideband imbalances. In some implementations, the transmit signal frequencies and frequency bands of the receiver filters may be adjusted to match any migration of the transducer's resonant frequencies.

After any such adjustments have been made, the processor(s) will perform obstacle monitoring in block 512 as needed to support the desired functions (e.g., blind spot monitoring, parking assistance, collision avoidance). In block 514, the processor(s) can determine whether the receive signals are potentially indicative of a change in transducer performance. If, for example, the transducer ring-down frequency or ring-down rate changes relative to previous values, the processor(s) may take this as an indication of a potential performance degradation and initiate a return to block 502 for a re-determination of the SLS curve. As another example, if the amplitude of a tracked obstacle doesn't follow an expected amplitude-range relationship, the processor(s) may take this too as an indication of potential performance degradation. As yet another example, if obstacle ranges detected with upper and lower sideband signals deviate from each other, the processors may take this as an indication of potential performance degradation. If too much time has elapsed since a previous SLS curve determination, the processor(s) may take this as an indication of potential degradation.

The disclosed method enables in field calculation of the SLS curve, enabling equalization of the side band channels to be maintained in field, enhancing dual channel operations in, e.g., park-assist systems. The compensation may also enable the transducer sensitivity and sound pressure equalization to be maintained in the field, enhancing single channel operations. The various method operations can be split between the sensor (or more specifically, the embedded DSP) and an ECU. For example, the sensor may perform phase and impedance measurements, and may further perform the calculations to determine model parameters. Alternatively, the ECU may receive phase and magnitude data from the sensor and perform the calculations to determine the model parameters. The SLS curve may be calculated in the sensor and transferred to the ECU. Alternatively, the ECU may calculate the SLS curve based off data received from the sensor. Either the sensor, the ECU, or a combination of both, may adjust correlator attenuation, adapt transmit current, and/or adapt gain settings.

The disclosed method is not limited to park-assist applications or to automotive applications. It can be implemented into a variety of ultrasonic sensor applications, for example: an ultrasonic sensor used to measure liquid levels; ultrasonic sonography; ultrasonic level sensing systems; etc.

The disclosed technology has been described above with reference to several exemplary embodiments. However, changes and modifications may be made to the exemplary embodiments without departing from the scope of the disclosed technology. For example, while an exemplary embodiment may have described a park assist system application, one of skill in the art will understand the disclosed technology may be implemented in other applications as well. As another example, while a the foregoing description teaches a few particular examples of series-parallel RLC circuits, one of skill in the art will understand the disclosed method may be accomplished with other such circuits capable of performing similar functions. In addition, exemplary specifications such as capacitance values or the number of components may have been described, but one of skill in the art will understand the disclosed technology is not limited to such specifications. These and other changes or modifications are intended to be included within the scope of the disclosure.

What is claimed is:

1. A method of operating a piezoelectric-based sensor, the method comprising:
sensing a response of a piezoelectric transducer as a function of frequency;
deriving parameter values of an equivalent circuit for the piezoelectric transducer from the response;
combining a stored compensation curve with a squared magnitude of a transfer function of the equivalent circuit to determine a system level selectivity, the stored compensation curve representing a difference between a previously measured system level selectivity curve and a squared transfer function magnitude curve; and
adapting at least one operating parameter of the sensor based on the system level selectivity.

2. The method of claim 1, wherein said adapting comprises adjusting a transmit signal current to counteract a variation in transmitted sound pressure level represented by a change of the system level selectivity.

3. The method of claim 1, wherein said adapting comprises adjusting a receive signal gain to counteract a variation in receiver sensitivity represented by a change of the system level selectivity.

4. The method of claim 1, wherein said adapting comprises adjusting a correlator attenuation to counteract a channel imbalance indicated by the system level selectivity.

5. The method of claim 1, wherein said using includes: normalizing the squared magnitude of the transfer function of the equivalent circuit.

6. The method of claim 1 wherein said combining includes includes:
measuring a temperature; and
based on the temperature, selecting the stored compensation curve from multiple stored compensation curves.

7. The method of claim 1, further comprising: performing target detection after adapting the at least one operating parameter.

8. A controller for a piezoelectric transducer, the controller comprising:
a transmitter that drives the piezoelectric transducer;
a receiver that senses a response of the piezoelectric transducer; and
a processing circuit coupled to the transmitter and to the receiver to perform calibration, the calibration including:
sensing a phase response of a piezoelectric transducer as a function of frequency;
deriving parameter values of an equivalent circuit for the piezoelectric transducer from the phase response;
combining a stored compensation curve with a squared magnitude of a transfer function of the equivalent circuit to determine a system level selectivity, the stored compensation curve representing a difference between a previously measured system level selectivity curve and a squared transfer function magnitude curve; and
adapting at least one operating parameter of the sensor based on the system level selectivity.

9. The controller of claim 8, wherein said adapting comprises adjusting a transmit signal current to counteract a variation in transmitted sound pressure level represented by a change of the system level selectivity.

10. The controller of claim 8, wherein said adapting comprises adjusting a receive signal gain to counteract a variation in receiver sensitivity represented by a change of the system level selectivity.

11. The controller of claim 8, wherein said adapting comprises adjusting a correlator attenuation to counteract a channel imbalance indicated by the system level selectivity.

12. The controller of claim 8, wherein said using includes: normalizing the squared magnitude of the transfer function of the equivalent circuit.

13. The controller of claim 8, wherein said combining includes:
measuring a temperature; and
based on the temperature, selecting the stored compensation curve from multiple stored compensation curves.

14. The controller of claim 8, further comprising: performing target detection after adapting the at least one operating parameter.

15. A system that comprises:
a transmitter that drives the piezoelectric transducer;
a receiver that senses a response of the piezoelectric transducer; and
one or more controllers collectively configured to calibrate at least one of the transmitter and to the receiver, the calibration including:
sensing a phase response of a piezoelectric transducer as a function of frequency;
deriving parameter values of an equivalent circuit for the piezoelectric transducer from the phase response;
combining a stored compensation curve with a squared magnitude of a transfer function of the equivalent circuit to determine a system level selectivity, the stored compensation curve representing a difference between a previously measured system level selectivity curve and a squared transfer function magnitude curve; and
adapting at least one operating parameter of the sensor based on the system level selectivity.

16. The system of claim 15, wherein said combining includes:
measuring a temperature; and
based on the temperature, selecting the stored compensation curve from multiple stored compensation curves.

17. The system of claim 15, further comprising: performing target detection after adapting the at least one operating parameter.

* * * * *